(12) United States Patent
Neystadt et al.

(10) Patent No.: US 12,348,535 B2
(45) Date of Patent: Jul. 1, 2025

(54) INDICATORS OF COMPROMISE OF ACCESS

(71) Applicant: VARONIS SYSTEMS, INC., New York, NY (US)

(72) Inventors: John Eugene Neystadt, Kfar-Saba (IL); Liron Raveh, Pardes Hanna-Karkur (IL)

(73) Assignee: VARONIS SYSTEMS, INC.

( * ) Notice: Subject to any disclaimer, the term of this patent is extended or adjusted under 35 U.S.C. 154(b) by 201 days.

(21) Appl. No.: 18/090,583

(22) Filed: Dec. 29, 2022

(65) Prior Publication Data

US 2024/0223577 A1    Jul. 4, 2024

(51) Int. Cl.
*H04L 29/06* (2006.01)
*H04L 9/40* (2022.01)

(52) U.S. Cl.
CPC ...... *H04L 63/1416* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 9,871,810 B1 | 1/2018 | Miskovic | |
| 11,444,951 B1 | 9/2022 | Patil et al. | |
| 12,041,091 B2 * | 7/2024 | Caceres | H04L 63/1433 |
| 2016/0080406 A1 | 3/2016 | Sadovsky et al. | |
| 2020/0336503 A1 | 10/2020 | Xu et al. | |
| 2020/0358804 A1 | 11/2020 | Crabtree et al. | |
| 2021/0120014 A1 | 4/2021 | Argoety et al. | |
| 2021/0326744 A1 | 10/2021 | Israel et al. | |
| 2022/0060497 A1 * | 2/2022 | Crabtree | G06N 20/00 |
| 2022/0263860 A1 * | 8/2022 | Crabtree | H04L 63/1425 |
| 2022/0292417 A1 | 9/2022 | Hen et al. | |
| 2023/0118388 A1 * | 4/2023 | Crabtree | H04L 63/123 726/23 |
| 2023/0370439 A1 * | 11/2023 | Crabtree | H04L 63/0428 |
| 2023/0370490 A1 * | 11/2023 | Crabtree | H04L 63/1433 |
| 2023/0370491 A1 * | 11/2023 | Crabtree | G06N 3/098 |
| 2023/0388278 A1 * | 11/2023 | Crabtree | H04L 63/0428 |
| 2023/0412620 A1 * | 12/2023 | Crabtree | H04L 63/1416 |
| 2023/0421593 A1 * | 12/2023 | Crabtree | H04L 63/1433 |
| 2024/0048586 A1 * | 2/2024 | Crabtree | H04L 63/123 |
| 2024/0064159 A1 * | 2/2024 | Crabtree | H04L 63/1466 |
| 2024/0211599 A1 * | 6/2024 | Koo | G06F 21/554 |
| 2024/0223577 A1 * | 7/2024 | Neystadt | H04L 63/1441 |
| 2024/0244068 A1 * | 7/2024 | Crabtree | H04L 63/1416 |
| 2024/0267402 A1 * | 8/2024 | Crabtree | G06F 16/2474 |
| 2024/0314146 A1 * | 9/2024 | Crabtree | H04L 63/0876 |
| 2024/0314162 A1 * | 9/2024 | Crabtree | H04L 63/1416 |

* cited by examiner

*Primary Examiner* — Jeffery L Williams
(74) *Attorney, Agent, or Firm* — SOROKER AGMON NORDMAN RIBA

(57) ABSTRACT

A method of prioritizing and handling events in a network, including receiving notification of an event, identifying an account that triggered the event, determining a group to which the account belongs, determining a blast radius for each account in the group and for the group, wherein the blast radius represents an exposure level of the group's accounts to data in the network relative to other accounts in the network, applying rules to prioritize handling of the events taking into consideration the group and blast radius.

20 Claims, 4 Drawing Sheets

INDICATORS OF COMPROMISE OF ACCESS

FIELD OF THE DISCLOSURE

The present disclosure relates to a system for anomaly detection and more specifically to prioritizing handling of anomaly events.

BACKGROUND OF THE DISCLOSURE

Anomaly detection based on logs or telemetry produced by various sensors is a common method for finding security breaches, malfunctions operational anomalies and other events in an enterprise network. Typically the anomalies require human attention and investigation to identify if the anomaly indicates that there is a problem or is the result of legitimate usage.

When dealing with large amounts of data it is complicated to establish a threshold profile for generating alerts. Typically a program that is designed to detect anomalies would require tuning to reach optimal performance. Tuning threshold values too aggressively would lead to many false positives. This requires investing resources to investigate alerts and can potentially hide real events, which are not investigated due to overloads. In contrast thresholds that are too permissive would tend to produce false negatives, missing real events. For example some servers/organizations require frequent password changing, which may cause an increase in user entry of the wrong password. The threshold value should then be adjusted to consider this feature. Another example is related to the difference between countries hosting the server/organization. Some countries such as China and Russia inspect TLS traffic, causing a lot of TLS connection failures. The threshold value should then take into account the country that is hosting the server/organization.

Tuning thresholds is a complex task therefore vendors try to tune the threshold for all environments. However due to differences between the environments optimal tuning of the threshold for one environment may be far from optimal for others.

Even in a tuned system there may be many events and it would be desirable to prioritize the events, so that the system can deal first with critical events and then deal with less important events.

SUMMARY OF THE DISCLOSURE

An aspect of an embodiment of the disclosure, relates to a system and method for prioritizing events in a communication network based on identifying a group, which an account related to the event belongs to and taking into consideration a blast radius of the group. Wherein the blast radius provides an indication of the damage that can be incurred by a security breach to an account of the group. Calculation of the blast radius for the group considers, the accounts that are members of the group, since members of the group tend to trust each other and thus lateral movement inside a peer group is risky.

In an embodiment of the disclosure, the groups are static and defined based on common parameters or characteristics of the accounts belonging to the groups. For example, forming a group of users belonging to a common organization department (e.g., accounting, finance, human resources). Alternatively or additionally, the groups are dynamic and defined based on accessibility to common data in the network by the accounts belonging to the groups. Optionally, the dynamic groups are defined based on classification of the data in the network and access permissions to the data in the network.

There is thus provided according to an embodiment of the disclosure, a method of prioritizing and handling events in a network, comprising:
 receiving notification of an event;
 identifying an account that triggered the event;
 determining a group to which the account belongs;
 determining a blast radius for each account in the group and for the group; wherein the blast radius represents an exposure level of the accounts belonging to the group to data in the network relative to data of other accounts in the network;
 applying rules to prioritize handling of the events taking into consideration the group and blast radius.

In an embodiment of the disclosure, the method further comprises reviewing classification of the data of the event and wherein the rules take into consideration the classification. Optionally, the group is a static group that is pre-configured. In an embodiment of the disclosure, the group is a dynamic group that is derived dynamically based on the accounts, and classifications and permissions of the data accessible by the accounts. Optionally, the group is a dynamic group that is derived dynamically based on reviewing events. In an embodiment of the disclosure, the accounts are selected from the group consisting of users, services and devices. Optionally, the rules include increasing or decreasing the number of events required to initiate an alert. In an embodiment of the disclosure, the rules include limiting the number of events in a given time period before initiating an alert. Optionally, the rules include increasing the priority of handling an event responsive to a higher blast radius of the account that triggered the event. In an embodiment of the disclosure, the blast radius considers the classifications and permissions of the data in the network.

There is further provided according to an embodiment of the disclosure, a system for prioritizing and handling events in a network, comprising:
 a central server computer having a processor and memory;
 a program that is executed by the central server;
 wherein the program is configured to perform the following:
  receiving notification of an event;
  identifying an account that triggered the event;
  determining a group to which the account belongs;
  determining a blast radius for each account in the group and for the group; wherein the blast radius represents an exposure level of the accounts belonging to the group to data in the network relative to data of other accounts in the network;
 Applying rules to prioritize handling of the events taking into consideration the group and blast radius.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
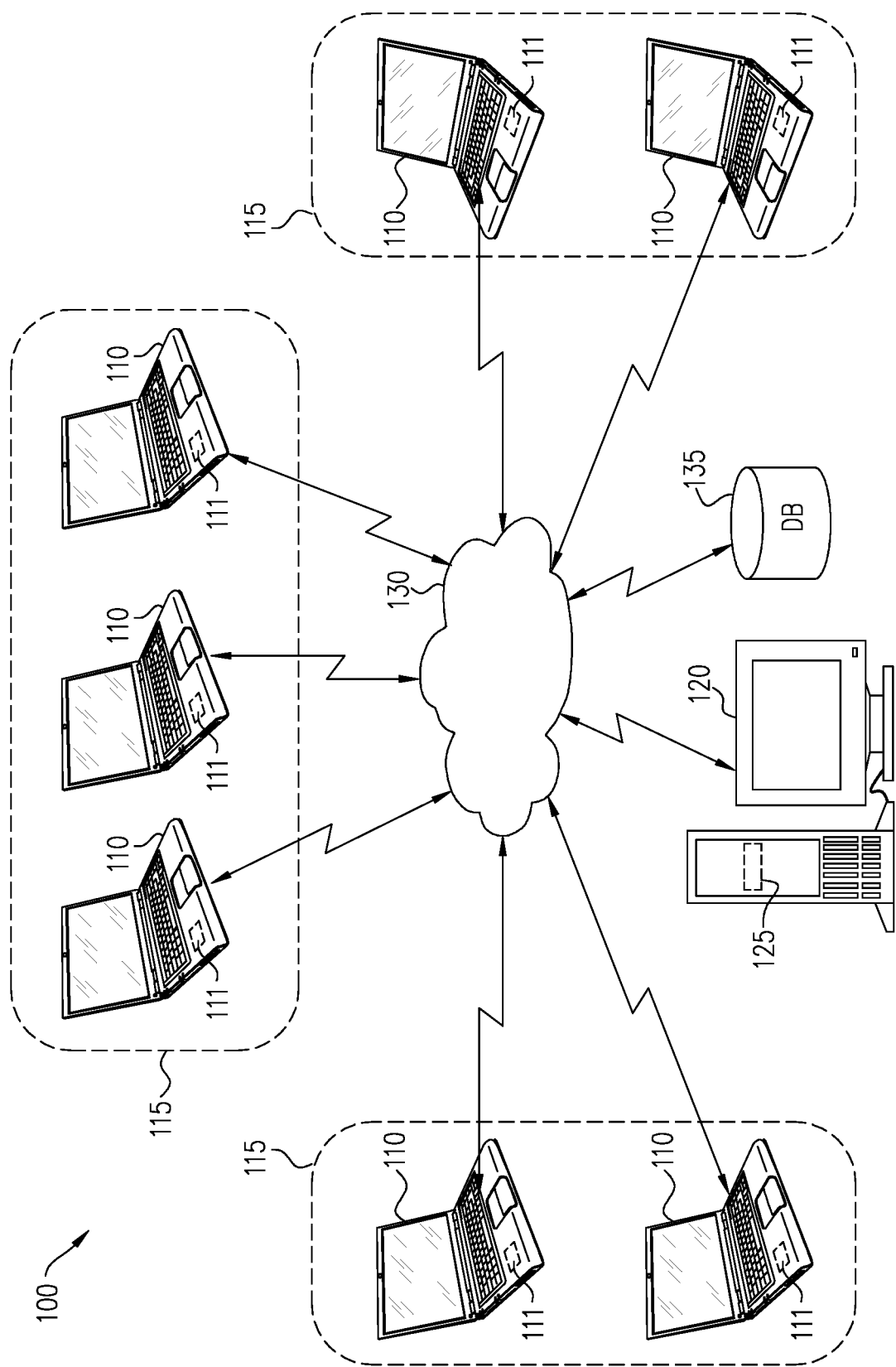
FIG. 1 is a schematic illustration of a system for prioritizing anomaly events in a network, according to an embodiment of the disclosure.

FIG. 1 is a schematic illustration of a system 100 for prioritizing anomaly events in a network 130, according to an embodiment of the disclosure. System 100 includes one or more computers 110 that communicate over network 130. Optionally, each computer 110 may include sensors 111 for detecting anomalies. The sensors 111 may be software models or hardware elements that provide measurements to computer 110.

For example the anomalies may include:
1) Multiple attempts to login to an application or sever with a wrong password over a short period of time;
2) Repetitive communication failures when communicating with a specific server/application;
3) Excessive downloading from a specific computer or uploading to a specific computer;
4. Receiving erroneous data from sensors 111.

Optionally, each computer 110 identifies events and reports them to a central server 120 or a local analyst for detecting and handling anomalies. In an embodiment of the disclosure, central server 120 includes an analysis program 125 for processing events comprising suspected anomalies. The analysis program 125 decides if the events should be handled as anomalies or not and assigns a priority to the event.

Initially to improve the accuracy of the anomaly prioritization, the analysis program 125 identifies groups of accounts, for example of users, services, devices (computers) or other principals. The groups 115 may be static pre-configured groups (e.g., employees in the same department) or dynamic groups that can be discovered (e.g., by program 125 or another program) by identifying similar access patterns.

For each group a blast radius is calculated. The blast radius represents how much data all the accounts in each group have access to, and how sensitive the data is. Thus, the blast radius provides an indication of the damage that can occur if someone manages to compromise an accounts data. The access to data is determined by scanning various data sources and applications and inspecting the permissions of the data to determine, which of the accounts in the group 115 have access to the data. The determined access can further differentiate between a type of access permission (e.g., read, write, and delete). Data sensitivity can be determined by pre-assigned labels or content classification (e.g., confidential data, or public access data). the data may be stored on a disk at a server or in a dedicated database 135 that is accessible by computers 110 over the network 130.

In an embodiment of the disclosure, when processing events of a specific account to decide if to raise an alert and what severity level to assign, the analysis program 125 uses configurable parameters and rules, which take into account the group the account is assigned to and the blast radius of the group. For example, accounts with a higher blast radius:
1. will require a smaller number of events to initiate an alert than accounts with a lower blast radius;
2. will set a lower limit on the number of alerts allowed for a given time period than accounts with a lower blast radius;
3. will assign a higher priority to handle events of lower severity than for accounts with a lower blast radius.

Since the blast radius provides an indication of the importance of the data handled by the group of accounts.

In an embodiment of the disclosure, when investigating an event of a specific account, indicators (e.g., numbers of events) of other accounts in the same group can be used to differentiate between false positives and true positives.

Figure 2:
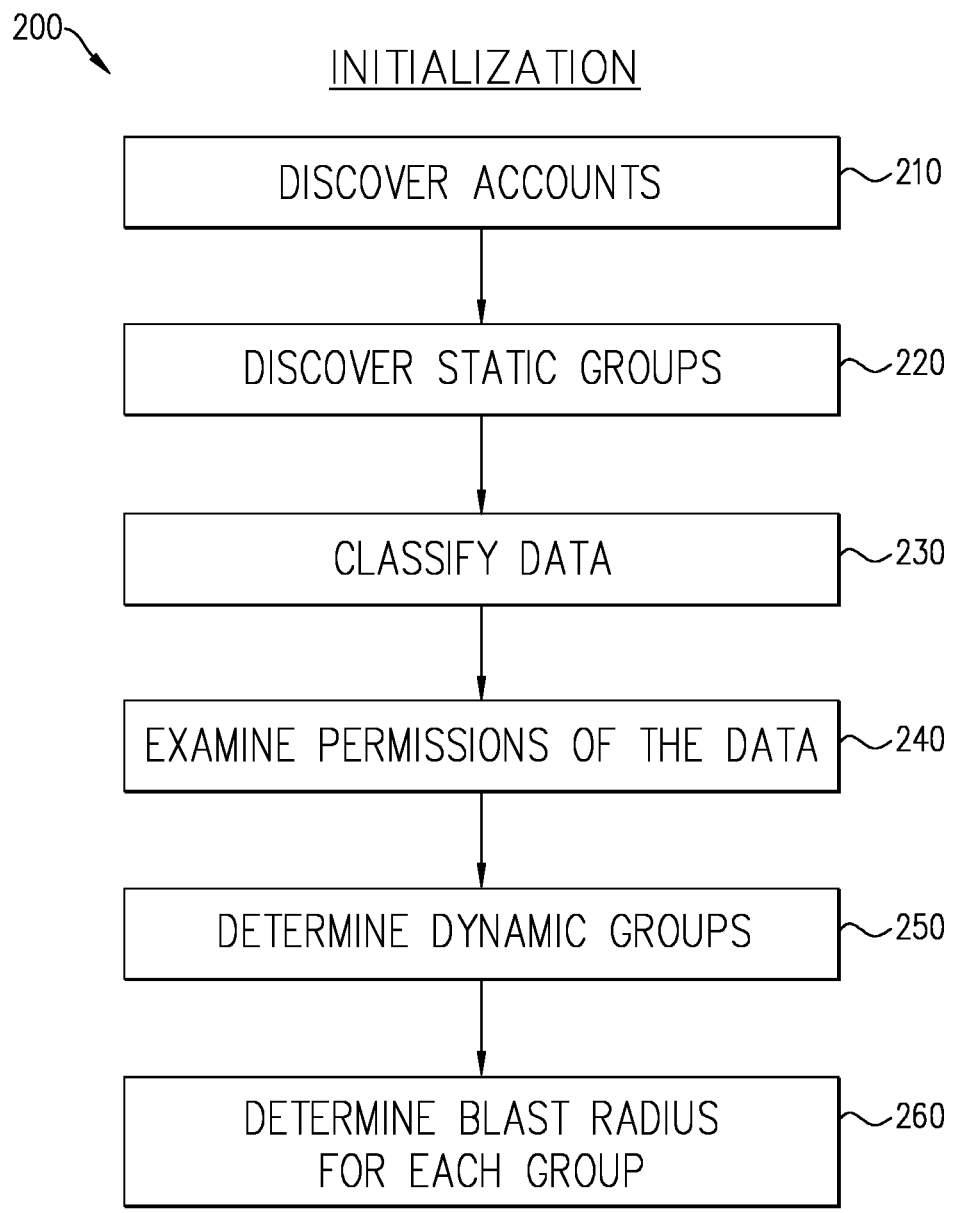
FIG. 2. Is a flow diagram of a process of initializing a system to prioritize events, according to an embodiment of the disclosure.

FIG. 2. Is a flow diagram of a process 200 of initializing system 100 to prioritize events, according to an embodiment of the disclosure. In an embodiment of the disclosure, analysis program 125 initially discovers the accounts (210), for example users, services, devices or other principles in network 130 that are affected by events. An event may be an erroneous attempt to access the account or to receive service from the account. The account information may be retrieved from a directory system such as LDAP or Active Directory or other sources such as by scanning the network to obtain a device list.

Optionally, analysis program 125 may also initially discover (220) static groups of accounts based on information provided by an operating system, an administrator or other entity authorized to define groups. For example employees working in the same department may be defined as a static group for having permission to access the same data.

In an embodiment of the disclosure, analysis program 125 examines the data of the network 130 to classify (230) the data, for example personal employee information, corporate financial data, general knowledge, confidential information and other classifications. Optionally, analysis program 125 also examines (240) the permissions of each file or data element, for example defining which accounts (e.g., users, devices) have access to the data.

In an embodiment of the disclosure, based on the accounts and classifications and permissions of the data accessible by the accounts, analysis program 125 determines (250) dynamic groups of accounts that share common classifications and/or permissions (e.g., users that have access to the same data) or have other common traits. Optionally, dynamic groups may change due to a change in file access permission or classification of files. The change may occur responsive to the change or periodically at specific times.

In an embodiment of the disclosure, analysis program 125 also determines (260) a blast radius for each dynamic or static group, representing an exposure level of the groups accounts to data in the network relative to other accounts in the network/organization and/or a level of risk to the organization associated with the information accessible by the group. In some embodiments of the disclosure, some members of the group may have access to more confidential data than other members. Optionally, the blast radius of the entire group will represent a stricter exposure level based on the permissions of the members with access to the most confidential data.

In an embodiment of the disclosure, the blast radius can be entered manually for each group or calculated automatically. For example, by dividing the number of accessible data elements by the group classified as sensitive by the total number of data elements in the organization. Optionally, the blast radius can be calculated for each account of a group and summed up for the group. In an embodiment of the disclosure, for multiple classifications (e.g., very sensitive/confidential/public or PII/PCI), each can be assigned a different weight in the blast radius calculation.

Figure 3:
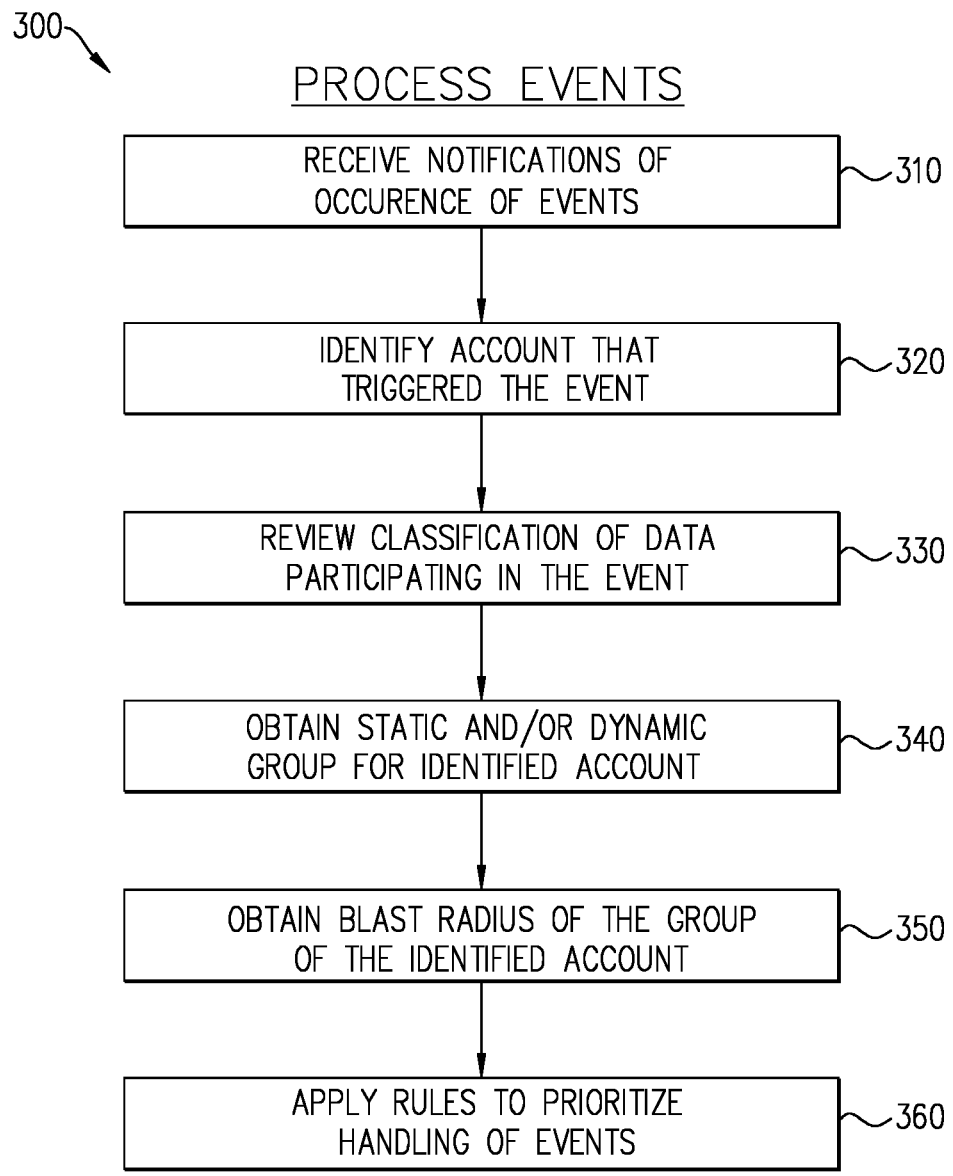
FIG. 3 is a flow diagram of a process of processing events, according to an embodiment of the disclosure.

FIG. 3 is a flow diagram of a process 300 of processing events, according to an embodiment of the disclosure. In an embodiment of the disclosure, analysis program 125 receives (310) notification of the occurrence of an event and identifies (320) the account that triggered the event. Optionally, Analysis program 125 reviews (330) the classification of the data participating in the event to evaluate the severity of the event. For example when an attempt is made to access critical financial information the attempt is considered more severe than attempting to access general commercial information.

In an embodiment of the disclosure, analysis program 125 obtains (340) the identity of the group 115 that the identified account belongs to. The group may be static or dynamic. Optionally, the analysis program 125 obtains (350) the blast radius of the static and/or dynamic group that the identified account belongs to.

In an embodiment of the disclosure, the analysis program 125 applies (360) rules that consider the account involved in the event, the classification of the data involved in the event, the group of the account involved in the event and the blast radius of the group involved in the event to prioritize handling of events. Optionally, some rules may consider all of the above considerations, and some may only consider some of the above considerations.

In an embodiment of the disclosure, the rules may include considering the numbers of events related to the same classification or group before initiating an alert in response to events, for example only initiating an alert if a user attempts to log in erroneously more than a specific number of times. Likewise, the rules may include placing a limit on the number of alerts issued in a given time period. The rules may also assign a specific alert severity or define who a specific alert is sent to for processing.

Figure 4:
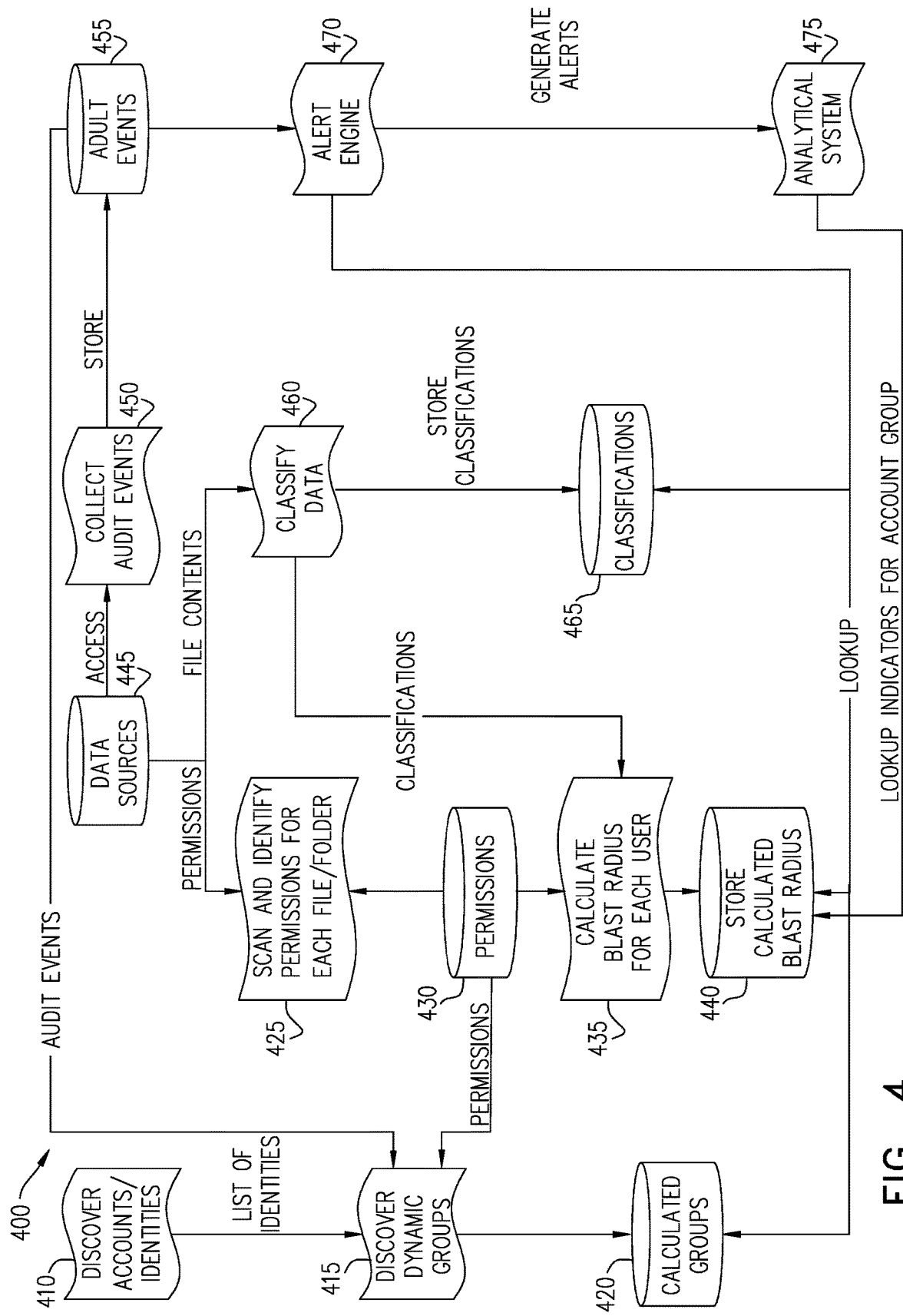
FIG. 4 is a block diagram 400 of an exemplary implementation for prioritizing events, according to an embodiment of the disclosure.

FIG. 4 is a block diagram 400 of an exemplary implementation for prioritizing events, according to an embodiment of the disclosure.

In an embodiment of the disclosure, an account discovery model 410 extracts lists of accounts and static groups from either a directory system, such as LDAP or Active Directory or other source, that for example scans the network 130 and obtains a list of devices. An audit event model 450 extracts audit events from network data sources 445 and stores them in an audit event repository 455. A classification model 460 scans files or data from the data sources 445, classifies the data and stores classification information in a classification repository 465. Likewise a permission model 425 scans files or data from data sources 445 and stores a permission list in a permission repository 430. A blast radius repository 440 stores an exposure level for accounts compared to other accounts in the organization. The blast radius information may be entered manually or calculated automatically, for example a blast radius calculation model 435 can compare the number of data elements, accessible by the account, which are classified as sensitive, in classification repository 460 and divide the number by the total number of accessible data elements in the organization. Optionally, the blast radius calculation may also use the permission repository 430 to limit the calculation only to files that the account has access to or write/delete permission.

In an embodiment of the disclosure, a group discovery model 415 extracts the permissions from the permission repository 430 and audit event data from audit events repository 455 to determine dynamic groups by identifying file permission similarity between accounts or similarity of actual file access events from the audit events stored in the audit event repository 455.

Alert engine 470 processes events from the audit event repository 455 based on the account that triggered the event (from model 410) to determine the static/dynamic groups related to the event from the groups stored in a group repository 420. Additionally, the alert engine 470 considers the blast radius of the account/group retrieved from the blast radius repository 440, and optionally, also takes into account the data classification from the data classification repository 465.

In an embodiment of the disclosure, alert engine 470 evaluates alert rules. Wherein the alert rules apply conditions related to one or more of the user account, static or dynamic group, blast radius and data classification. The rules decide if to execute an alert for an event or accumulation of events and assign a priority in handling the events. The rules may also decide who should handle the event.

In an embodiment of the disclosure, an analytical system 475 processes the alerts to notify the appropriate administrators or technicians.

In an embodiment of the disclosure, analysis program 125 may be stored on a non-transitory computer readable memory and provided to a computer such as central server 120, which includes a processor and memory. Program 125 can be loaded into the memory of the computer and executed by the processor to implement the methods described above for handling and prioritizing events in a network. Optionally, the non-transitory memory may be a CD, DVD, Diskonkey or other non-volatile memory device.

It should be appreciated that the above-described methods and apparatus may be varied in many ways, including omitting, or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present invention is not limited to what has been particularly shown and described hereinabove. Rather the scope of the present invention is defined only by the claims, which follow.

We claim:

1. A method of prioritizing and handling events in a network, comprising:
   receiving notification of an event;
   identifying an account that triggered the event;
   determining a group to which the account belongs;
   determining an account blast radius for each account in the group and a group blast radius for the group; wherein the account blast radius represents an exposure level of accounts belonging to the group to data in the network relative to data of other accounts in the network; and wherein the group blast radius is calculated by summing up the account blast radiuses of the accounts in the group;
   applying rules to prioritize handling of the events taking into consideration the group and group blast radius.

2. The method of claim 1, further comprising reviewing classification of the data of the event and wherein the rules take into consideration the classification.

3. The method of claim 1, wherein the group is a static group that is pre-configured.

4. The method of claim 1, wherein the group is a dynamic group that is derived dynamically based on the accounts, and classifications and permissions of the data accessible by the accounts.

5. The method of claim 1, wherein the accounts are selected from the group consisting of users, services and devices.

6. The method of claim 1, wherein the rules include increasing or decreasing the number of events required to initiate an alert.

7. The method of claim 1, wherein the rules include limiting the number of events in a given time period before initiating an alert.

8. The method of claim 1, wherein the rules include increasing the priority of handling an event responsive to a higher account blast radius of the account that triggered the event.

9. The method of claim 1, wherein the account blast radius considers the number of accessible data elements by the account that are classified as sensitive divided by the total number of data elements accessible by the network.

10. The method of claim 1, wherein the account blast radius considers the classifications and permissions of the data in the network.

11. A system for prioritizing and handling events in a network, comprising:
a central server computer having a processor and memory;
a program that is executed by the central server;
wherein the program is configured to perform the following:
receiving notification of an event;
identifying an account that triggered the event;
determining a group to which the account belongs;
determining an account blast radius for each account in the group and a group blast radius for the group;
wherein the account blast radius represents an exposure level of accounts belonging to the group to data in the network relative to data of other accounts in the network; and wherein the group blast radius is calculated by summing up the account blast radiuses of the accounts in the group;
Applying rules to prioritize handling of the events taking into consideration the group and group blast radius.

12. The system of claim 11, wherein the program further comprises reviewing classification of the data of the event and wherein the rules take into consideration the classification.

13. The system of claim 11, wherein the group is a static group that is pre-configured.

14. The system of claim 11, wherein the group is a dynamic group that is derived dynamically based on the accounts, and classifications and permissions of the data accessible by the accounts.

15. The system of claim 11, wherein the accounts are selected from the group consisting of users, services and devices.

16. The system of claim 11, wherein the rules include increasing or decreasing the number of events required to initiate an alert.

17. The system of claim 11, wherein the rules include limiting the number of events in a given time period before initiating an alert.

18. The system of claim 11, wherein the rules include increasing the priority of handling an event responsive to a higher account blast radius of the account that triggered the event.

19. A non-transitory computer readable medium comprising an executable program configured to perform the method of claim 1.

20. The method of claim 1, wherein the group is a dynamic group that is derived dynamically based on reviewing events.

* * * * *